United States Patent [19]

Ackermann et al.

[11] Patent Number: 5,078,240
[45] Date of Patent: Jan. 7, 1992

[54] ADJUSTABLE VIBRATION DAMPER WITH VALVE BODY IN PISTON HAVING DIRECTIONAL FLOW CONTROL

[75] Inventors: Norbert Ackermann; Hubert Beck, both of Eitorf, Fed. Rep. of Germany

[73] Assignee: BOGE AG, Eitorf, Fed. Rep. of Germany

[21] Appl. No.: 556,222

[22] Filed: Jul. 20, 1990

[30] Foreign Application Priority Data

Jul. 21, 1989 [DE] Fed. Rep. of Germany ....... 3924169
May 25, 1990 [DE] Fed. Rep. of Germany ....... 4016807

[51] Int. Cl.[5] ............................. F16F 9/46; F16F 9/34
[52] U.S. Cl. .................................. 188/285; 188/299; 188/322.15; 251/38
[58] Field of Search .................... 188/299, 319, 322.15, 188/285, 278, 275, 282, 289, 322.14; 251/38

[56] References Cited

U.S. PATENT DOCUMENTS

| 2,020,833 | 11/1935 | Hansen | 251/38 |
| 2,694,544 | 11/1954 | Hall | 251/38 |
| 3,339,680 | 9/1967 | Tuneblom | 188/322.14 |
| 4,401,196 | 8/1983 | Grundei | 188/322.14 X |
| 4,723,640 | 2/1988 | Beck | 188/319 |
| 4,732,408 | 3/1988 | öhlin | 188/322.15 X |
| 4,749,070 | 6/1988 | Moser et al. | 188/299 |
| 4,785,920 | 11/1988 | Knecht et al. | 188/299 |
| 4,850,460 | 7/1989 | Knecht et al. | 188/299 |
| 4,850,461 | 7/1989 | Rubel | 188/322.15 X |
| 4,880,086 | 11/1989 | Knecht et al. | 188/299 |
| 4,896,867 | 1/1990 | Schyboll et al. | 267/140.1 |

FOREIGN PATENT DOCUMENTS 3428306 2/1986 Fed. Rep. of Germany.
3719113 6/1987 Fed. Rep. of Germany.

Primary Examiner—Robert J. Oberleitner
Assistant Examiner—Josie A. Ballato
Attorney, Agent, or Firm—Nils H. Ljungman & Associates

[57] ABSTRACT

Adjustable vibration damper for motor vehicles with a cylinder containing damping fluid, an axially-movable piston rod immersed therein, and a damping piston attached to the piston rod, which divides the cylinder into two work chambers, whereby a damping valve equipped with a valve body and a control edge controls the effective cross section of a damping passage. The valve body has an antechamber which is in communication with the upper and lower work chamber by means of at least one passage having a check valve, and that starting from the antechamber, there is a constant throttle cross section to the back side of the valve body to pressurize a control pin controlling a throttle passsage of the valve body.

19 Claims, 7 Drawing Sheets

ADJUSTABLE VIBRATION DAMPER WITH VALVE BODY IN PISTON HAVING DIRECTIONAL FLOW CONTROL

BACKGROUND OF THE INVENTION

1. Field of the Invention

This invention relates to an adjustable vibration damper for motor vehicles with a cylinder containing damping fluid, an axially-movable piston rod immersed therein, and a damping piston attached to the piston rod, which divides the cylinder into two work chambers, and a damping valve equipped with a valve seat, which by means of an axially movable valve body controls the effective cross section of a damping passage, whereby the valve body has at least one constant throttle cross section running from its pressurized end surface to the opposite back side, and an additional throttle passage running from the back side in the discharge direction of a flow connection is controlled by an axially movable, continuously positionable control pin.

2. Background Information

The prior art discloses hydraulically adjustable vibration dampers (e.g. DE-PS 37 19 113), corresponding to U.S. Pat. No. 4,880,086 whose damping force in the decompression and compression direction can be continuously adjusted. For this purpose, a damping valve equipped with an axially movable valve body and a valve seat controls the effective cross section of a damping passage. The throttle cross section of the damping passage is thereby controlled by an axially movable, continuously positionable control pin which interacts with the valve body. In such an arrangement, the damping valve can receive the flow on one side only, and is therefore suitable primarily for use in two-tube dampers having a bypass system. Use of such a damping valve in a single-tube vibration damper requires a complex construction with numerous check valves and thus leads to restrictions in the tuning of the damping forces in the decompression and compression stages.

The prior art also discloses adjustable vibration dampers for motor vehicles (e.g. DE-OS 34 28 306), in which there is an apparatus to influence the damping forces in the damping piston of the vibration damper. On account of the design of the valve, the adjustable apparatus in the damping piston can receive the flow from two sides. The apparatus is oriented so that between the main stage and the pilot stage, there is no displacement feedback but there is only a force feedback produced by leaf springs, so that during the equalization of the damping forces, the user must put up with problems, with imprecise force and time behavior and with a tendency to self-excited vibrations. An additional disadvantage is the complicated structure, in particular the connection of the power feed to the moving magnet coil in oil. Another disadvantage is that the effect of the electromagnetic intervention in the damping force curve reverses between the decompression and compression stage (the high decompression stage corresponds to the low compression stage and vice-versa).

OBJECT OF THE INVENTION

The object of the invention is therefore to create an adjustable, hydraulic vibration damper with a continuously adjustable, rapid and precise control, which can be configured both as a single-tube vibration damper and as a two-tube vibration damper, and which can be produced with little fabrication complexity or expense, whereby the overall height of the valve unit is to be kept as low as possible.

SUMMARY OF THE INVENTION

This objective is accomplished by the invention, in that the valve body of the damping valve is provided with an antechamber which is in communication with the upper and lower work chamber by means of at least one passage having a check valve, whereby starting from the antechamber, the constant throttle cross section runs to the back side of the valve body to pressurize the control pin controlling the throttle passage of the valve body, and that starting from the throttle passage, there is a flow connection containing an additional check valve into the upper and lower work chamber.

An advantage of this configuration is that for the control and regulation of the damping medium in the vibration damper, a pilotable valve is used, which has a self-supplied pilot stage. In this case, the pressure difference producing the damping force is used to adjust the valve body. A control of the valve unit by the drive element is also possible both in the compression direction and also in the decompression direction of the vibration damper.

According to an additional essential feature, the constant throttle cross section is a constriction in at least one passage.

A particularly favorable embodiment of the invention specifies that the control pin is spring loaded.

In one configuration of the invention, the valve body is spring loaded.

Another essential feature is that the control pin can be electronically activated for positioning. An electromagnet is advantageously provided for the activation of the control pin.

According to an additional significant configuration of the invention, the passage and/or the throttle passage and/or the passages and flow connections equipped with check valves run at least partly through the valve body.

In one configuration of the invention, at least one of the check valves is integrated into the valve body.

In one particularly favorable embodiment, the valve housing is contained in the damping piston. In that manner, at least one of the passages emptying into one of the work chambers and/or at least one flow connection emptying into one of the work chambers is advantageously located so that it runs at least partly in the valve housing.

In accordance with another significant feature, the damping piston is designed as a valve housing.

Preferred embodiments are schematically illustrated in the accompanying drawings.

One aspect of the invention resides broadly in an adjustable vibration damper for motor vehicles with a cylinder containing damping fluid, an axially-movable piston rod immersed therein, and a damping piston attached to the piston rod, which divides the cylinder into two work chambers, and a damping valve equipped with a valve seat, which by means of an axially movable valve body controls the effective cross section of a damping passage, whereby the valve body has at least one constant throttle cross section running from its pressurized end surface to the opposite back side, and an additional throttle passage running from the back side in the discharge direction of a flow connection is controlled by an axially movable, continuously positionable control pin, wherein the valve body of the damping valve has an antechamber which is always connected from the upper and lower work chamber via at least one passage with a check valve, whereby starting from the antechamber, there is a constant throttle cross section running to the back side of the valve body to pressurize the control pin controlling the throttle passage of the valve body, and that starting from the throttle passage there is a flow connection with an additional check valve in the upper and lower work chamber.

Another aspect of the invention resides broadly in an adjustable vibration damper for motor vehicles with a cylinder containing damping fluid, an axially-movable piston rod immersed therein, and a damping piston attached to the piston rod, which divides the cylinder into two work chambers, and a damping valve equipped with a valve seat, which by means of an axially movable valve body controls the effective cross section of a damping passage, whereby the valve body has at least one constant throttle cross section running from its pressurized end surface to the opposite back side, and an additional throttle passage running from the back side in the discharge direction of a flow connection is controlled by an axially movable, continuously positionable control pin; and means for displacement feedback of the axially movable valve body.

DESCRIPTION OF THE PREFERRED EMBODIMENT

Figure 1:
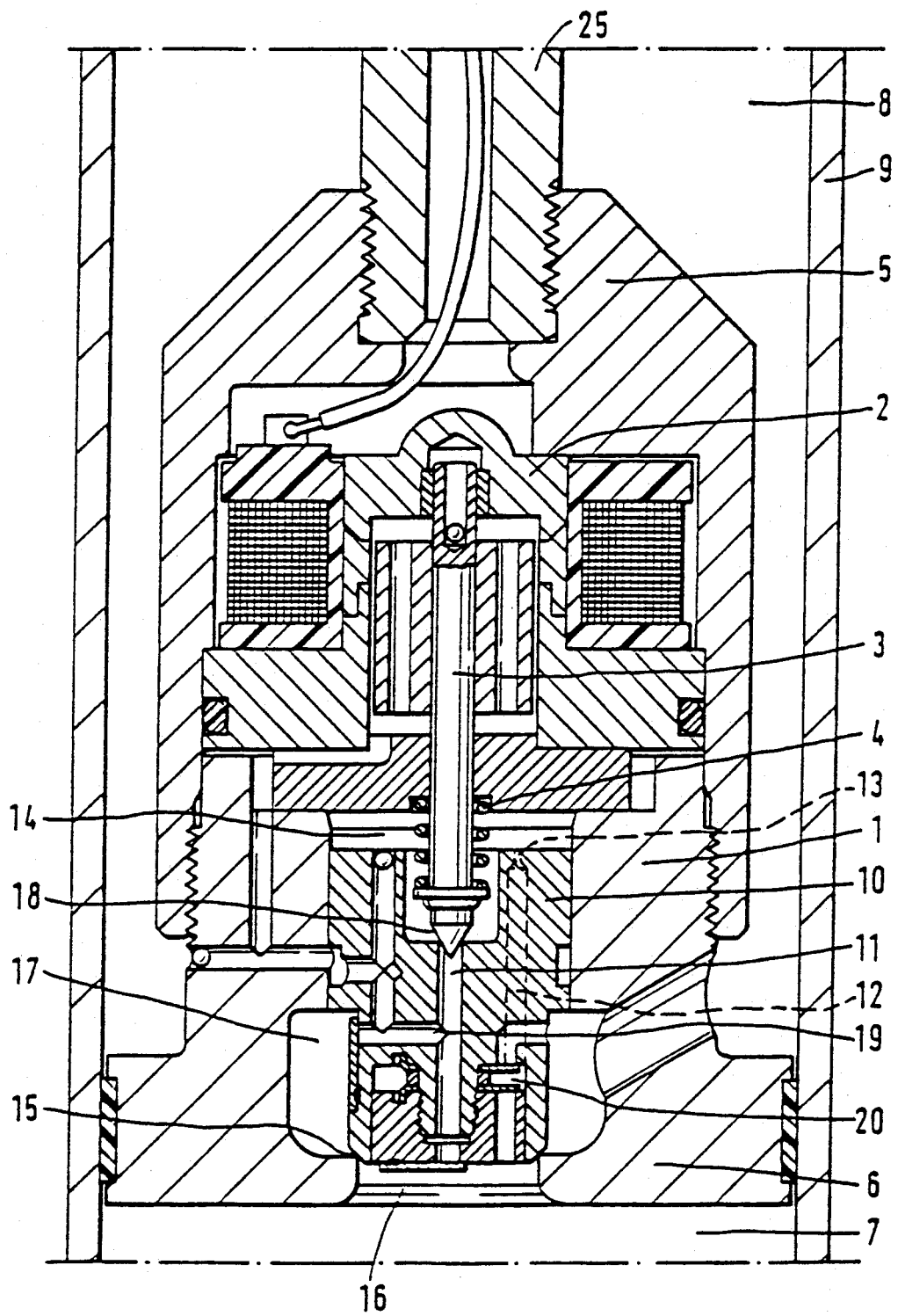
FIG. 1 is a view of a vibration damper with a valve unit integrated into the damping piston.

FIG. 1 is a schematic illustration of a vibration damper which consists of the cylinder 9, a piston rod 25 and a damping piston 6 fastened to the piston rod 25. The damping piston 6 divides the cylinder 9 into the upper work chamber 8 and the lower work chamber 7. In the damping piston 6 there is a damping valve to produce damping forces. The load-bearing parts of the damping piston 6 are formed by the valve housing 1 and the housing 5 of the drive element 2.

The valve body 10 guided in the valve housing 1, together with a control edge or valve seat 15, forms three chambers in all, the first of which represents the bottom chamber 16, the second the ring chamber 17 and the third the control chamber 14, connected by passages with the bottom chamber 16 and the ring chamber 17. As seen in FIG. 1, the valve body 10 has an external surface, which external surface is generally exposed towards each of the bottom chamber 16, the ring chamber 17 and the control chamber 14. Furthermore, as a matter of convention, the portion of the external surface facing bottom chamber 16 may be termed a "first portion" of the external surface and the portion facing control chamber 14 may be termed a "second portion". Passages from the bottom chamber 16 and the ring chamber 17 lead into an antechamber 20. The antechamber 20 is connected via check valves 23 and 24, through a passage or conduit 12 and a constriction 13 into the control chamber 14. Together, the antechamber 20, check valves 23 and 24 and passage 12 form what may be termed a directional flow control valve. From the control chamber 14, a throttle passage 11 leads via additional check valves or exit flow control valves 21 and 22 back into the upper work chamber 8 and/or the lower work chamber 7.

Contained in the housing 5 of the drive element 2 is a control pin 3, which continuously, in a substantially stepless manner opens and closes the throttle passage 11 with its pressurization or valve surface 18. Together, the control pin 3, valve surface 18 and entrance to the passageway 11 form a pilot valve. The valve body 10 is thereby also axially movable, so that the control pin 3 and the valve body 10 can move axially and independently of one another relative to the valve housing 1. The control pin 3 is thereby loaded by the spring 4.

Figure 2:
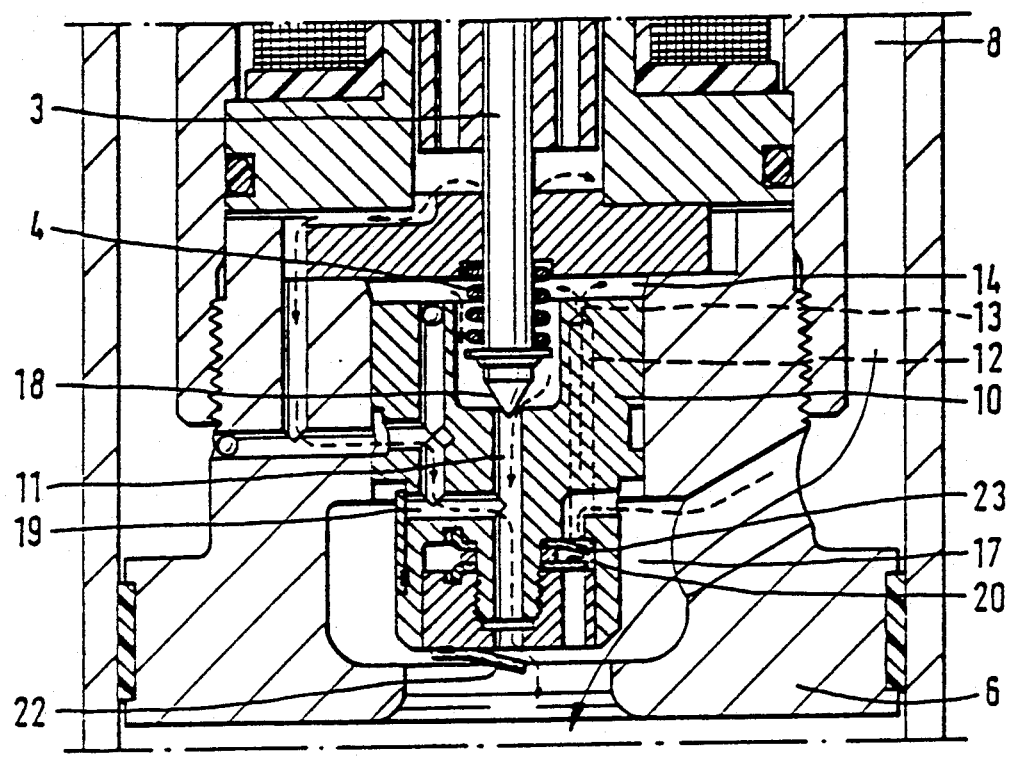
FIG. 2 is a cross section of a vibration damper with the damping medium flowing through in the decompression direction.
Figure 3:
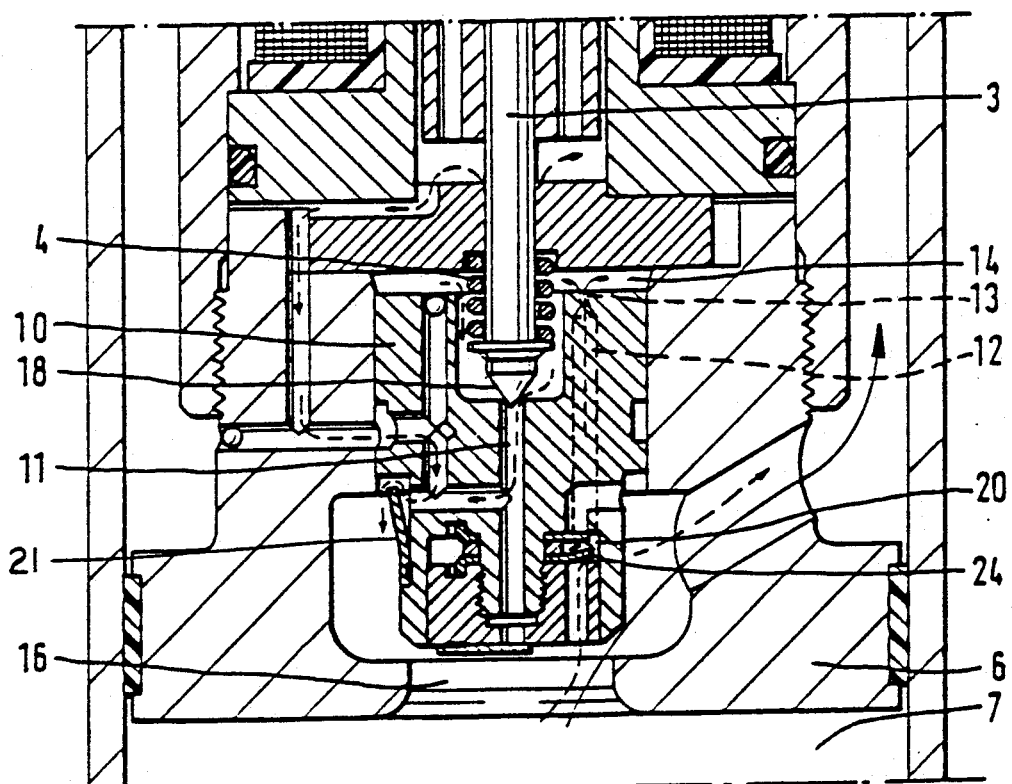
FIG. 3 is a cross section of a vibration damper with the damping medium flowing through in the compression direction.

The operation of the damping valve in the damping piston 6 of the vibration damper is illustrated in FIG. 2 for the decompression stage and in FIG. 3 for the compression stage.

FIG. 2 shows the damping piston 6 when the damping medium is flowing through in the decompression direction. From the upper work chamber 8, damping medium flows into the ring chamber 17, and from there via the check valve 23 into the antechamber 20 Through the passage 12 and the constriction 13, the damping medium travels into the control chamber 14, and by means of the pressurization surface 18, deflects the control pin 3 against the spring 4. While the damping medium used for the pilot control is discharged via the passage 11, the flow connection 19 and the check valve 22, the valve body 10 follows the control pin 3 at a defined distance, and opposite in relation to the control edge 15 opens the passage for the damping fluid in the main stage.

In FIG. 3, the damping piston 6 is shown as the damping medium is flowing through in the compression direction. Damping medium flows out of the lower work chamber 7 in the compression stage into the bottom chamber 16, and from there via the check valve 24 into the antechamber 20. From the antechamber 20, the damping medium travels via the passage 12 and the constriction 13 into the control chamber 14 and deflects the control pin 3 by means of its pressurization surface 18 against the spring 4. While the damping medium for the pilot control flows out via the throttle passage 11, the flow connection 19 and the check valve 21, the valve body 10 follows the control pin 3 and opens an outlet to the control edge 15 for the damping medium (main stage).

FIGS. 2 and 3 both additionally illustrate other possibilities for the flow of damping medium. Particularly, damping piston 6 may contain additional chambers and passageways for the flow of damping medium such that any damping medium not flowing through the passageway 11 may alternatively flow through those chambers and passageways. For example, FIGS. 2 and 3 both show that a small amount of fluid may flow along the surface of the control pin 3 and in a direction away from the passageway 11. This small amount of fluid may then enter a chamber, from which a series of passageways may lead the fluid to the vicinity of the check valves 21, 22, thus ensuring that this small amount of fluid rejoins the fluid which went through passageway 11.

FIGS. 2 and 3 also clearly illustrate the action of check valves 21 and 22 during both a compression stroke and a decompression stroke of the damping piston 6. In FIG. 2, during a decompression stroke of the damping piston 6, damping fluid is caused to travel from upper work chamber 8 to ring chamber 17 and thence to bottom chamber 16. As is inherently clear from FIG. 2, there is generally little or no resistance on check valve 22 from fluid in bottom chamber 16 in that, as shown by the large arrow, fluid is generally flowing past the valve body 10 and through the bottom chamber 16. Thus, under such circumstances, as shown, fluid from inside the valve body 10 should generally apply enough pressure on check valve 22 to force check valve 22 to open. FIG. 3 shows a similar phenomenon in reverse, in which, as is inherently clear from FIG. 3, fluid entering bottom chamber 16 to upper work chamber 8 should generally apply enough pressure to check valve 22 to cause fluid from within the valve body 10 to exit via check valve 21. As in FIG. 3, the motion of fluid throughout the apparatus is clearly illustrated by means of arrows.

Figure 4:
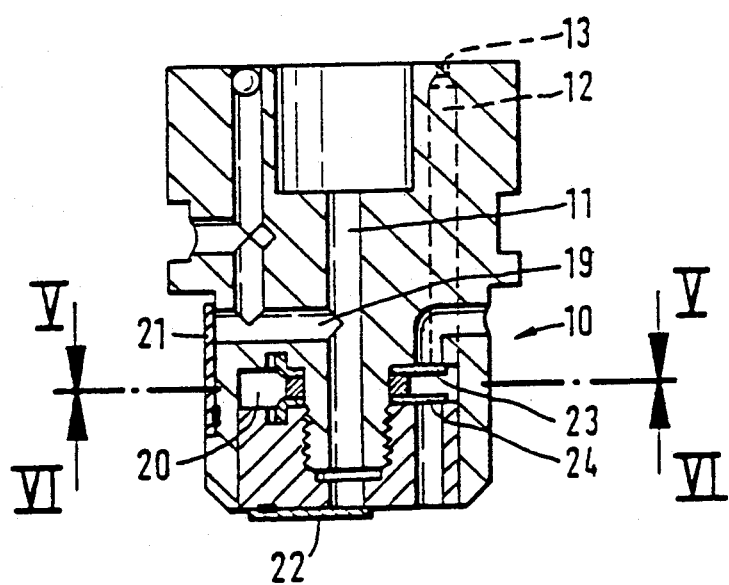
FIG. 4 is a detail of the valve body in cross section.

FIG. 4 shows a detail of a valve body 10, whereby in particular the ring-shaped antechamber is shown with its check valves 23 and 24, and whereby starting from the antechamber 20, the passage 12 is shown with its constriction 13. Starting from the control chamber 14, the throttle passage 11 runs in a straight line to the check valve 22 or via the flow connection 19 to the check valve 21.

Figure 5:
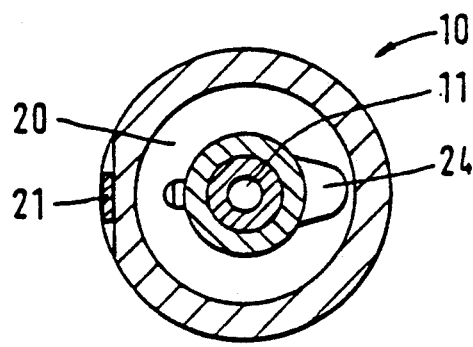
FIG. 5 is a cross section through the valve body illustrated in FIG. 4.

FIG. 5 shows a cross section through the valve body 10, whereby the throttle passage 11 is surrounded concentrically by the antechamber 20, and the tongue-shaped check valve 24 is located inside the antechamber 20. The check valve 21 shown in an overhead view is located on the outer circumference of the valve body 10.

Figure 6:
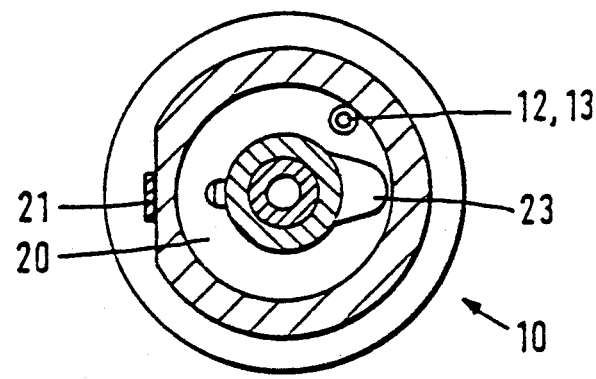
FIG. 6 is an additional cross section through the valve body illustrated in FIG. 4.

FIG. 6 shows, in a view from a different direction, another cross section of the valve body 10 illustrated in FIG. 4. Concentrically around the throttle passage 11 there is again the antechamber 20, whereby the tongue-shaped check valve 23 is intended to guarantee the influx of damping medium into the antechamber 20. The passage 12 with its constriction 13 leads out of this antechamber 20, whereby again, the check valve 21 is located on the outer circumference of the valve body 10.

Figure 7:
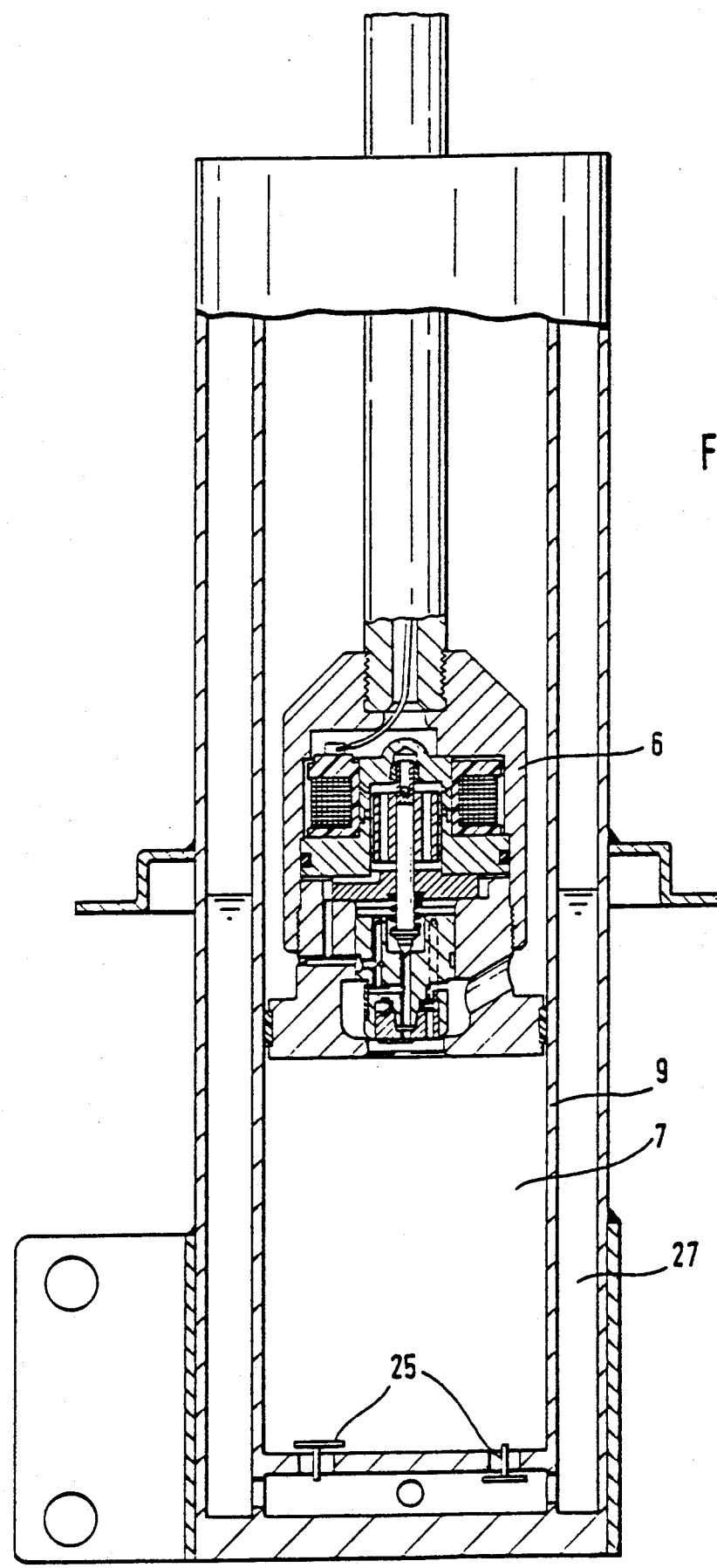
FIGS. 7 to 10 illustrate several applications.

FIG. 7 shows one embodiment in which the damping valve is located in the damping piston 6 of a two-tube vibration damper. Thereby, outside the cylinder 9, there is an equalization chamber 27 which is in communication with the lower work chamber 7 by means of bottom valves 25.

Figure 8:
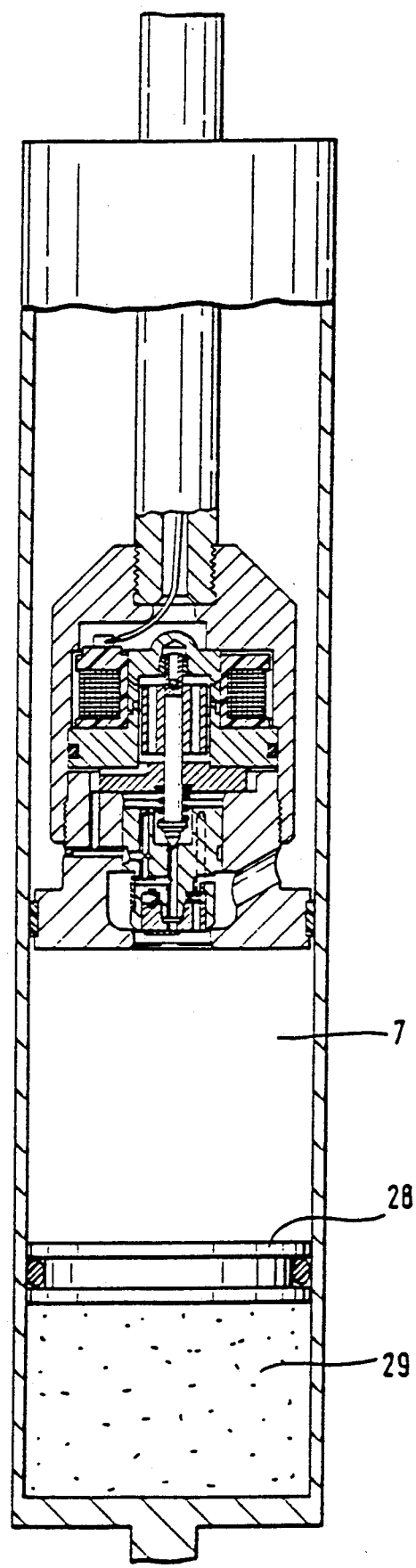

One embodiment of a single-tube vibration damper is illustrated in FIG. 8, in which the work chamber 7 is separated by a separation piston 28 from a gas chamber 29.

Figure 9:
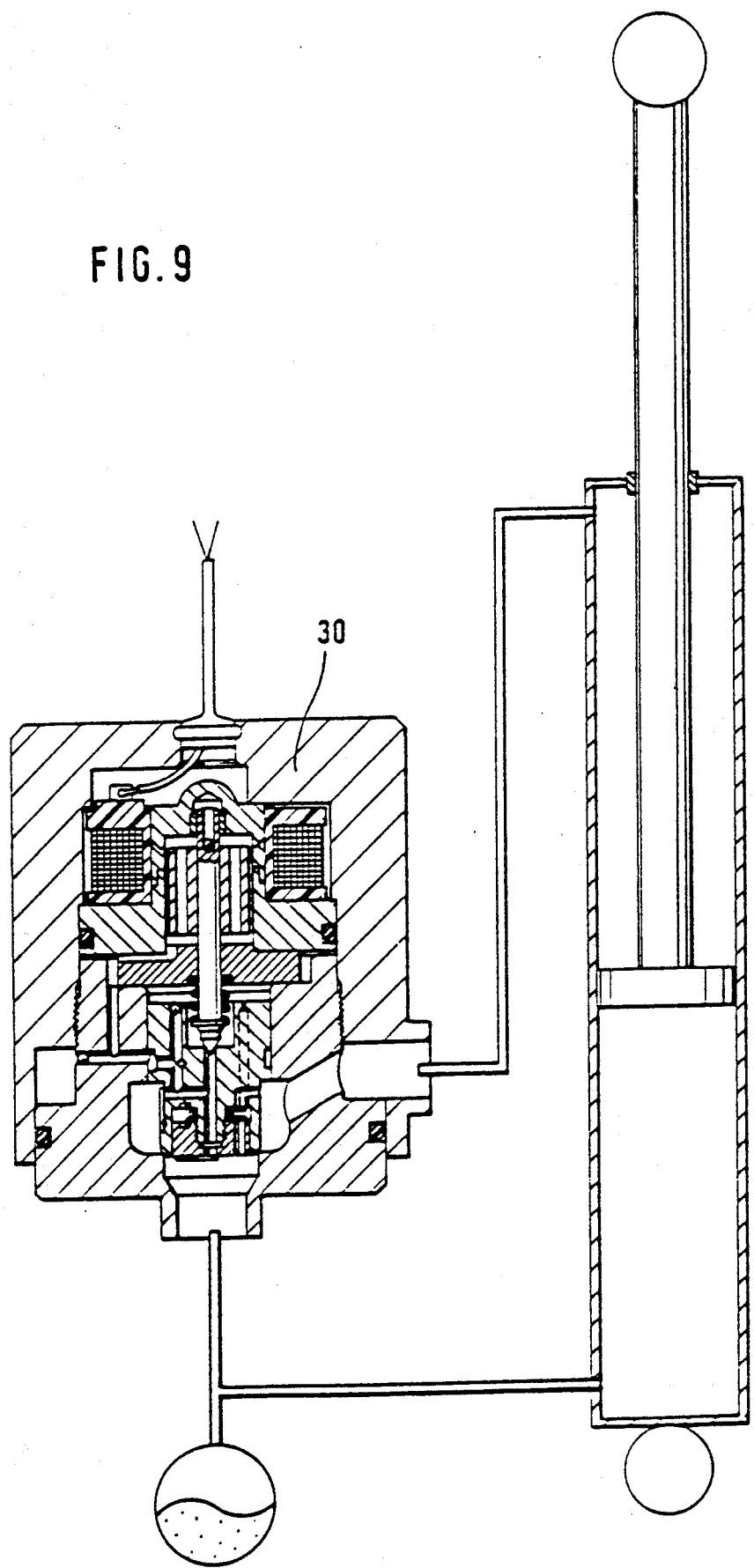
Figure 10:
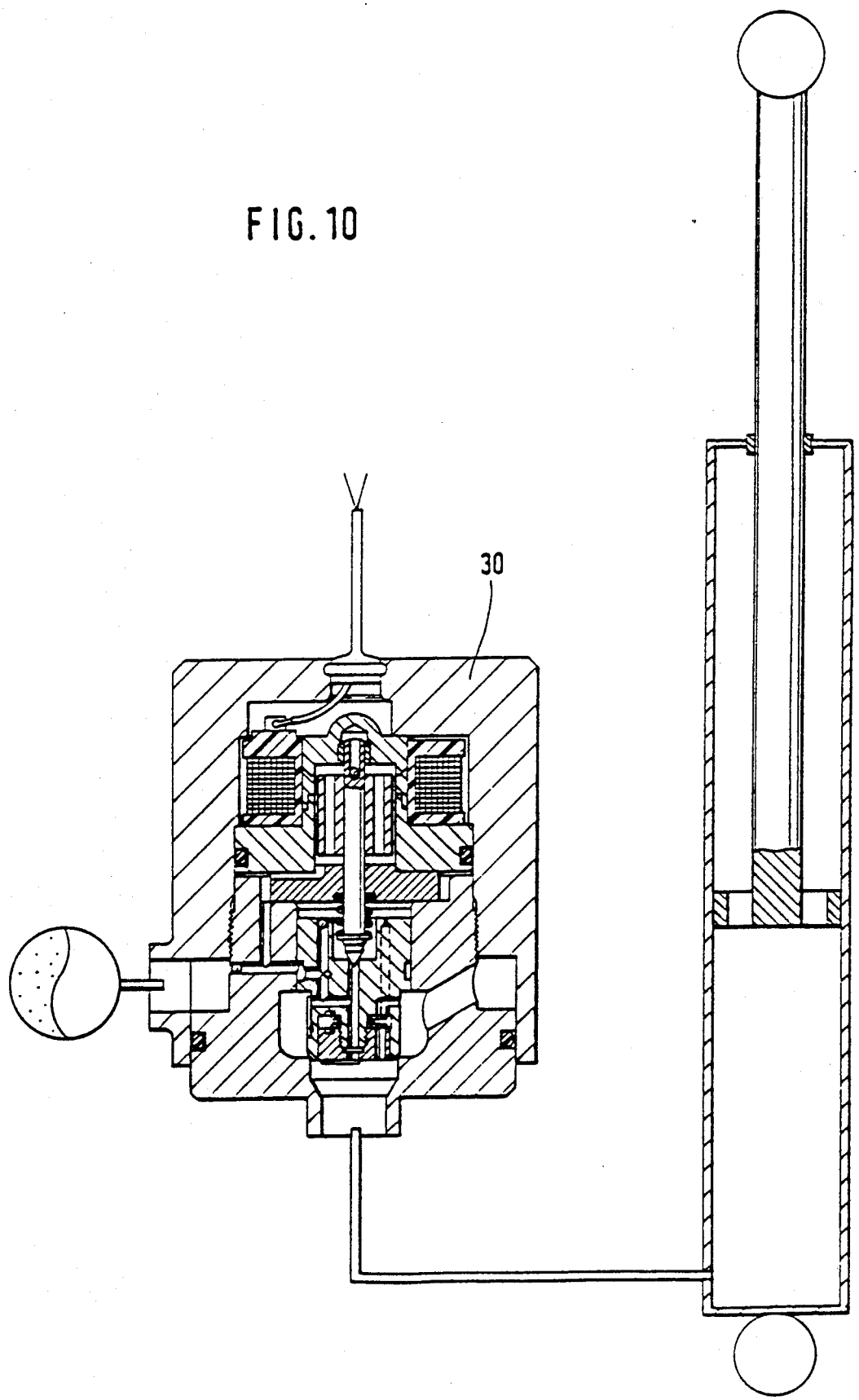

FIGS. 9 and 10 show embodiments in which the damping valve is located outside the shock absorber or vibration damper 32 in a separate component 30.

Some examples of apparatuses in which the present adjustable vibration damper could be used are Federal Republic of Germany Laid Open Patent Application No. P 38 10 638 which corresponds to U.S. Pat. application No. 07/330,334 issued as U.S. Pat. No. 4,989,148 entitled, "Apparatus for the Computer-Assisted Control of Vibration Dampers of a Vehicular Suspension System as a Function of the Roadway", U.S. Pat. No. 4,723,640 entitled "Adjustable Hydraulic Vibration Damper", U.S. Pat. No. 4,785,920 entitled "Hydraulic Adjustable Shock Absorber", U.S. Pat. No. 4,850,460 entitled "Hydraulic Adjustable Shock Adsorber", U.S. Pat. No. 4,880,086 entitled "Adjustable Vibration Damper".

In summary, one feature of the invention resides broadly in an adjustable vibration damper for motor vehicles with a cylinder containing damping fluid, an axially-movable piston rod immersed therein, and a damping piston attached to the piston rod, which divides the cylinder into two work chambers, and a damping valve equipped with a valve seat, which by means of an axially movable valve body controls the effective cross section of a damping passage, whereby the valve body has at least one constant throttle cross section running from its pressurized end surface to the opposite back side, and an additional throttle passage running from the back side in the discharge direction of a flow connection is controlled by an axially movable, continuously positionable control pin, characterized by the fact that the valve body 10 of the damping valve has an antechamber or prechamber 20 which is always connected from the upper 8 and lower work chamber 7 via at least one passage with a check valve 23, 24, whereby starting from the antechamber 20, there is a constant throttle cross section 13 running to the back side of the valve body 10 to pressurize the control pin 3 controlling the throttle passage 11 of the valve body 10, and that starting from the throttle passage 11 there is a flow connection with an additional check valve 21, 22 in the upper and lower work chamber 7, 8.

Another feature of the invention resides broadly in a vibration damper characterized by the fact that as the constant throttle cross section, there is at least one constriction 13 in at least one passage 12.

Yet another feature of the invention resides broadly in a vibration damper characterized by the fact that the control pin 3 is activated by means of a spring 4.

A further feature of the invention resides broadly in a vibration damper characterized by the fact that the valve body 10 is spring loaded.

A yet further feature of the invention resides broadly in a vibration damper characterized by the fact that the control pin 3 can be electronically activated for positioning.

Yet another further feature of the invention resides broadly in a vibration damper characterized by the fact that there is an electromagnet 2 to activate the control pin 3.

An additional feature of the invention resides broadly in a vibration damper characterized by the fact that the passage 12 and/or the throttle passage 11 and/or the passages or flow connections with the check valves 23, 24 and 21, 22 respectively run at least partly through the valve body.

A yet additional feature of the invention resides broadly in a vibration damper characterized by the fact that at least one of the check valves 21, 22, 23, 24 is integrated in the valve body 10.

A further additional feature of the invention resides broadly in a vibration damper characterized by the fact that the valve housing 1 is contained in the damping piston 6.

A yet further additional feature of the invention resides broadly in a vibration damper characterized by the fact that at least one of the passages emptying into one of the work chambers 7, 8 and/or at least one flow connection emptying into one of the work chambers 7, 8 is located so that it runs at least partly in the valve housing 1.

Another further additional feature of the invention resides broadly in a vibration damper characterized by the fact that the damping piston 6 is designed as a valve housing 1.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:
    said piston assembly having a piston rod and piston;
    said piston rod having first means for attachment of said piston rod at one end thereof;
    said cylinder assembly having second means for attachment at a portion thereon other than said first means for attachment at said piston rod;
    said piston assembly including damping valve means for regulating flow of damping fluid between said at least two chambers;
    said damping valve means comprising:
    a valve seat and a valve body for opening and closing against said valve seat;
    pilot valve means for controlling the opening and closing of said damping valve means;
    directional flow control means comprising first and second directional flow control valve means;
    said first flow control valve means being disposed to open during a compression stroke of said piston assembly and to route damping fluid from a first of said chambers to said pilot valve means;
    said second flow control valve means being disposed to open during a decompression stroke and to route damping fluid from a second of said chambers to said pilot valve means;
    said directional flow control means comprising means for connecting said first and second flow control valve means and for directing flow of damping fluid in a single direction through said pilot valve means; and
    said directional flow control means being disposed in at least a portion of said valve body.

2. The vibration damper according to claim 1, said damping valve means comprising:
    said valve body having an external surface, said external surface comprising a first portion being disposed generally towards said valve seat and a second portion substantially opposite said first portion.

3. The vibration damper according to claim 2, wherein said directional flow control means is disposed for routing damping fluid from at least a portion of said external surface at least to said second portion of said external surface.

4. The vibration damper according to claim 3, said directional flow control means comprising:
    an internal chamber;
    said first flow control valve means being disposed for routing said damping fluid between said first portion of said valve body and said internal chamber;
    said second flow control valve means being disposed for routing said damping fluid between a portion of said external surface and said internal chamber.

5. The vibration damper according to claim 4, wherein said directional flow control means comprises conduit means being disposed for routing said damping fluid between said internal chamber and said second portion of said valve body.

6. The vibration damper according to claim 5, wherein said conduit means is constantly open.

7. The vibration damper according to claim 6, said pilot valve means comprising:
    exit flow control means comprising first and second exit flow control valve means;
    said first exit valve means being disposed to open during a compression stroke of said piston assembly and to route damping fluid from said pilot valve means at least to said second chamber; and
    said second exit valve means being disposed to open during a decompression stroke of said piston assembly and to route damping fluid from said pilot valve means at least to said first chamber.

8. The vibration damper according to claim 7, wherein said first exit valve means is disposed to route damping fluid from said second portion of said valve body to another portion of said valve body.

9. The vibration damper according to claim 8, wherein said second exit valve means is disposed to route damping fluid from said second portion of said valve body to said first portion of said valve body.

10. The vibration damper according to claim 9, wherein said pilot valve means comprises a pilot valve seat and a pilot valve body for opening and closing against said pilot valve seat and thereby controlling flow of damping fluid through said exit flow control means.

11. The vibration damper according to claim 10, wherein said pilot valve body and said valve body are independently displaceable relative to each other.

12. The vibration damper according to claim 11, wherein said conduit means comprises at least one constriction.

13. The vibration damper according to claim 12, further comprising spring means for displacing said pilot valve body.

14. The vibration damper according to claim 13, further comprising spring means for displacing said valve body.

15. The vibration damper according to claim 14, further body.

16. The vibration damper according to claim 15, wherein said electronic means comprises an electromagnet.

17. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

said piston assembly having a piston rod and piston;
said piston rod having first means for attachment of said piston rod at one end thereof;
said cylinder assembly having second means for attachment at a portion thereon other than said first means for attachment at said piston rod;
damping valve means for regulating flow of said damping fluid between said at least two chambers;
said damping valve means comprising:
a valve seat and a valve body for opening and closing against said valve seat;
pilot valve means for controlling the opening and closing of said damping valve means;
directional flow control means comprising first and second directional flow control valve means;
said first flow control valve means being disposed to open during a compression stroke of said piston assembly and to route damping fluid from a first of said chambers to said pilot valve means;
said second flow control valve means being disposed to open during a decompression stroke and to route damping fluid from a second of said chambers to said pilot valve means;
said directional flow control means comprising means for connecting said first and second flow control valve means and for directing flow of damping fluid in a single direction through said pilot valve means; and
said directional flow control means being disposed in at least a portion of said valve body.

18. The vibration damper according to claim 17, said vibration damper comprising:
said valve body having an external surface, said external surface comprising a first portion being disposed generally towards said valve seat and a second portion substantially opposite said first portion;
said directional flow control valve means being disposed for routing damping fluid from at least a portion of said external surface at least to said second portion of said external surface;
said directional flow control means comprising an internal chamber;
said first flow control valve means being disposed for routing said damping fluid between said first portion of said valve body and said internal chamber;
said second flow control valve means being disposed for routing said damping fluid between a portion of said external surface and said internal chamber;
conduit means being disposed for routing said damping fluid between said internal chamber and said second portion of said valve body; and
said conduit means being constantly open.

19. A vibration damper for motor vehicles, said damper comprising a cylinder assembly having an arrangement for varying damping of a piston assembly disposed therein, said piston assembly dividing said cylinder into at least two chambers, each for containing damping fluid, said vibration damper comprising:

said piston assembly having a piston rod and a piston;
damping valve means for regulating flow of damping fluid;
said damping valve means comprising:
a valve seat and a valve body for opening and closing against said valve seat;
a pilot valve seat and a pilot valve body for opening and closing against said pilot valve seat;
said valve body having a first portion being disposed generally towards said valve seat and a second portion opposite said first portion;
said valve body comprising an internal chamber;
at least one flow control valve means for connecting said internal chamber and said chambers, said flow control valve means comprising at least one check valve for regulating flow of damping fluid;
conduit means connecting said second portion of said valve body and said internal chamber;
said conduit means being constantly open;
said conduit means being for directing flow from said internal chamber to said pilot valve body for pressurizing and thereby displacing said pilot valve body;
throttle conduit means connecting said second portion of said valve body and said at least two chambers, said throttle conduit means comprising at least one check valve for regulating flow of damping fluid; and
said pilot valve body being disposed to control flow of damping fluid into said throttle conduit means.

* * * * *

UNITED STATES PATENT AND TRADEMARK OFFICE
CERTIFICATE OF CORRECTION

PATENT NO. : 5,078,240
DATED : January 7, 1992
INVENTOR(S) : Norbert ACKERMANN and Hubert BECK It is certified that error appears in the above-identified patent and that said Letters Patent is hereby corrected as shown below:

In column 8, line 65, Claim 15, after 'further', insert --comprising electronic means for positioning said pilot valve--.

Signed and Sealed this

Twenty-sixth Day of October, 1993

Attest:

BRUCE LEHMAN

Attesting Officer

Commissioner of Patents and Trademarks